United States Patent Office 3,004,159
Patented Oct. 10, 1961

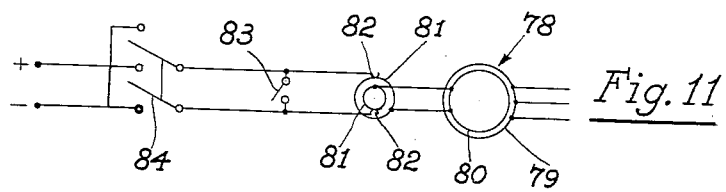
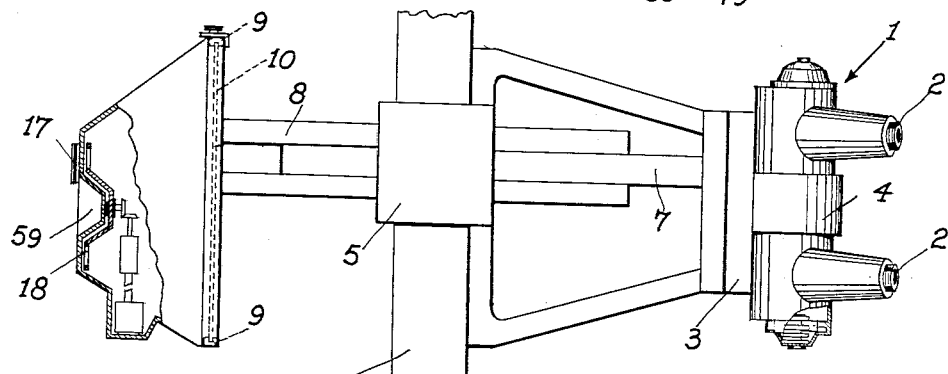
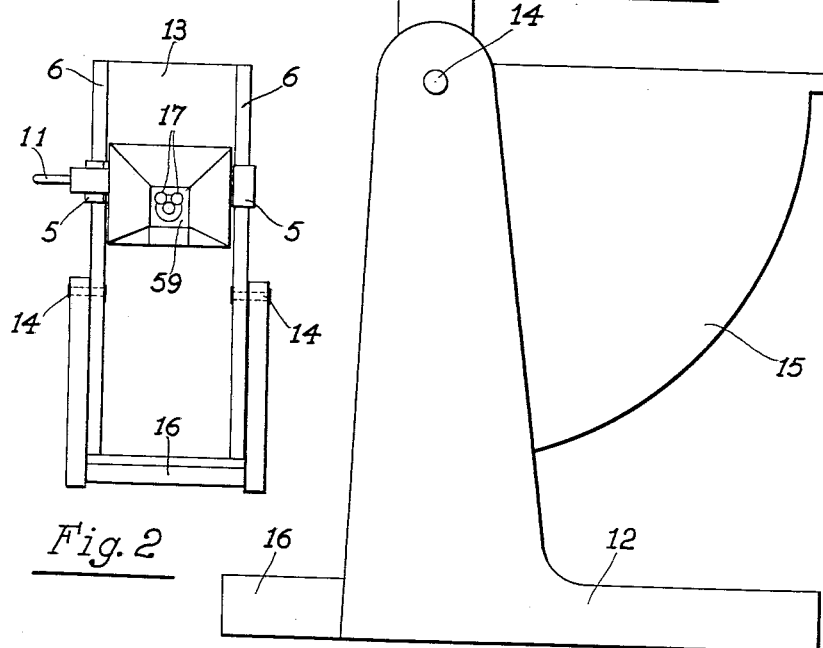

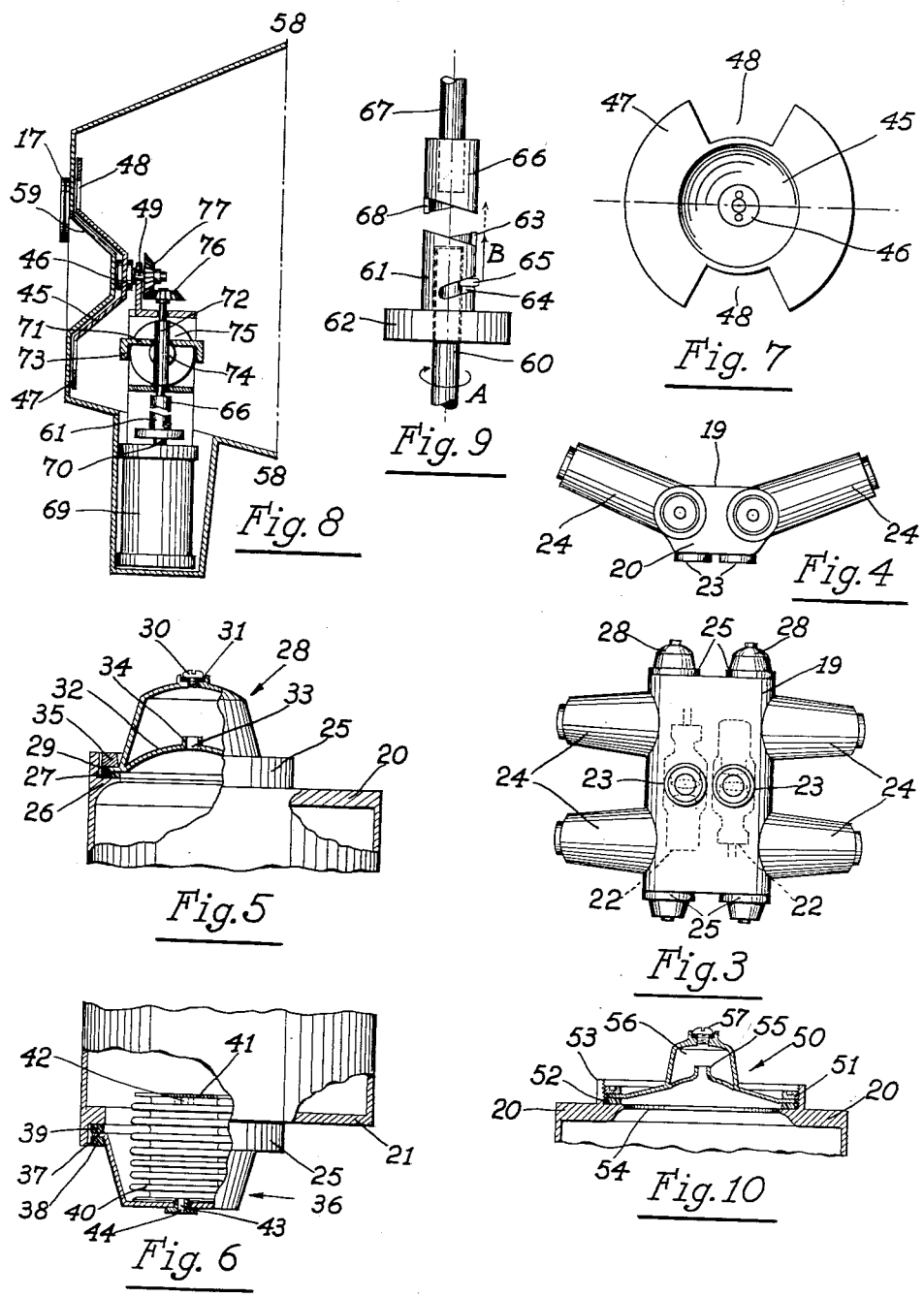

3,004,159
THREE-DIMENSIONAL RADIOLOGY APPARATUS
Massimo Brancaccio, 4 Piazza Gesu e Maria, Naples, Italy
Filed Nov. 7, 1957, Ser. No. 695,024
Claims priority, application Italy Nov. 7, 1956
9 Claims. (Cl. 250—60)

This invention relates to three-dimensional radioscopy and radiography apparatus for use in radiology, and is more particularly concerned with a number of improvements in this kind of apparatus.

It is known that a three-dimensional vision of a suitable space for practical purposes is attained in radioscopy by alternately projecting images of such space onto a fluorescent screen in rapid succession from two X-ray sources. The images projected by one of the two sources are viewed by one eye of an observer, and the images projected by the other source are viewed by the other eye, each eye seeing separately from the other and synchronously with the image projections from the respective X-ray source. The rate of projection and disappearance of images projected by the X-ray sources is such that the images from the same source follow one another with a shorter interval than the time of image persistence on the human retina. The two X-ray sources are arranged in a support wherein they are supplied with electric current in push-pull relationship, each of them operating as a rectifier and emitting X-rays during the half-cycles in which the current has one direction, whereby each X-ray tube will emit the rays during $1/120$ of a second each time where the frequency is 60 cycles. The X-rays thus emitted by one of the tubes will alternate with those emitted by the other tube, and the viewing equipment comprises two eyepieces provided with a shutter the operation of which is synchronous with the alternations of current in the tubes, whereby each eye of an observer viewing the screen sees the image projected by one tube, and he will gain a three-dimensional vision of the image. An apparatus of this kind may be either a direct vision or an indirect vision one. With the former, the images projected onto a fluorescent screen are observed on this screen direct, no fixed parts of the apparatus being between the eyepieces and screen. With the other type of apparatus, however, the vision of images projected onto the fluorescent screen will take place by means of either a reflecting or a refracting system, or even by a mixed system based on both optical principles, fixed parts of apparatus being interposed between the eyepieces and screen.

When it is desired to use an apparatus of the kind referred to for obtaining stereoscopic photos, two separate images of the same subject projected on the fluorescent screen may be taken successively, or even two separate projections of the same subject from the two X-ray sources may be fixed on two X-ray sensitive surfaces. In either case, the photos obtained will be viewed in a conventional stereoscope.

The equipment for supplying electric current to the X-ray tubes may either be included within the apparatus or comprises a separate unit. In a self-contained radiology apparatus, an X-ray source support means forms a unit with the casing wherein equipment is arranged for supplying the high voltage required, and is provided with two openings through which the X-rays are projected, or even with a single opening through which two beams of rays may alternately be formed during the operation of the apparatus.

In the known apparatus of this kind, the X-ray source support means containing a liquid wherein the X-ray tubes are immersed has the disadvantage that gas bubbles are produced in the liquid mainly due to the temperature rise liberating a portion of gas dissolved in the liquid at room temperature, and these bubbles may cause flashovers when crossing a region of strong electric field in the insulating liquid, since they will reduce the thickness of the latter.

In the known viewing apparatus, the eyepiece shutter affording an intermittent vision to the observer's eyes is of the revolving disc type. With this type of shutter, however, a flickering occurs which is not only uncomfortable to the users of a viewer, but reduces the efficiency of observation. This is mainly due to the transition time from vision to concealing of screen, and vice versa, which time is very short and cannot be reduced, since it is in accordance with the frequency at which the X-rays are emitted, which is, in turn, subordinate to the very short time of residual luminescence of the fluorescent screen.

The present invention is directed to an apparatus of the kind referred to which embodies a number of novel and improved cooperating features providing for ease and efficiency in the use of the apparatus, and eliminates all the above mentioned disadvantages.

According to one embodiment of this invention, the eyepiece shutter shaft is made to revolve at synchronous speed with the current frequency by a synchronous motor which is started by an asynchronous motor, the two motors being coupled by means of a novel clutch specially developed to bring the synchronous motor to synchronous speed from rest or from a lower speed. The clutch comprises two members, one member being driven by the asynchronous motor, and the other member being fixed to the synchronous motor shaft. The latter motor consists of an electromagnet to be supplied with single-phase current from the mains, and has a four-arm cross-like armature, one of the poles of the magnet facing this armature. Where the frequency in the mains is 60 cycles, the magnet has its polarity reversed at every 120th of a second, thus imparting a thrust to the armature at every reversal of current direction, whereby the armature speed will be such as to turn $1/4$ of a revolution in one 120th of a second. The shutter has two apertures, and will uncover the two eyepieces successively with an interval of $1/120$ of a second during each half of a revolution, the rotation speed being 1800 r.p.m.

An object of this invention is to provide an X-ray source support means for use with a three-dimensional radiology apparatus wherein both X-ray sources can be arranged.

A further object of this invention is to provide an improved type of X-ray source support means having two openings for projecting X-rays.

A still further object of this invention is to provide means for operating a viewing means synchronously with an X-ray source without a direct connection with each other.

Still another object of the invention is to provide an X-ray source support means wherein flashovers caused by gas inclusions are prevented.

Yet another object of this invention is to provide a viewing means eyepiece shutter which will prevent flickering.

A still further object of this invention is to connect the shaft of a synchronous motor for the viewing means shutter shaft to the shaft of a starting motor by means of a clutch controlled by speed changes of the driving shaft.

Further objects and advantages of this invention will become more readily apparent from the following description taken in conjunction with the accompanying drawings, in which:

FIG. 1 is a side elevational view, partly sectional, of a three-dimensional radiology apparatus incorporating the improvements according to this invention, supported on a reversible mounting, with an upright partly broken away;

FIG. 2 is a front elevational view of the apparatus of FIG. 1, on a smaller scale;

FIG. 3 is a front elevational view of an X-ray source support means for the apparatus of FIGS. 1 and 2;

FIG. 4 is a plan view of the support means of FIG. 3;

FIG. 5 is an enlarged side view, partly sectional, of a cap closing one end of the support means of FIGS. 3 and 4 and having a dome for separating gas from liquid;

FIG. 6 is also an enlarged side view, partly sectional, of a cap closing one end of the support means of FIGS. 3 and 4, provided with a corrugated tube;

FIG. 7 is a front view of the hollow portion of an eyepiece shutter for the apparatus of FIGS. 1 and 2;

FIG. 8 is an enlarged sectional view of the portion of a viewing means wherein an eyepiece shutter of the invention is mounted;

FIG. 9 is a side elevational view of a clutch for transmitting motion from a starting motor to the synchronous motor for the viewing means eyepiece shutter;

FIG. 10 is a sectional view of a cover substituted for the caps in the X-ray source support means of FIGS. 3 and 4; and FIG. 11 diagrammatically shows a three-phase asynchronous motor having a single-phase wound rotor with connection leads, suitable for a viewing means eyepiece shutter.

Referring to FIGS. 1 and 2, a three-dimensional radiology apparatus is shown for direct vision, which is provided with an X-ray source support means 1, this being of a sufficient size to receive two X-ray tubes. In the embodiment shown, the electric current for the X-ray tubes is supplied from a remote source, through suitable high-voltage cables, the terminals of the latter, not shown, being inserted in sockets 2. X-ray source support means 1 is fixed to flange 3 in the apparatus frame by means of a tie member 4 held in place by means of screws or otherwise, in such a way that flange 3 may rotate by 90° in either direction. The X-ray generating equipment is supported by a mounting frame and is provided with slides 5 for movement along uprights 6. Rigidly connected to the mounting frame is a fixed guide 7 along which a slide 8 is movable, this slide being rigidly connected to frame 9 which carries screen 10 with anti-X-ray glass and provides for longitudinal movement thereof. All movements are imparted to the X-ray generating equipment and frame 9 by means of a control hand grip 11. The equipment is supported by base 12 which carries plate 13 pivotally connceted to the latter at 14 to swing to the extent as defined by sector 15, uprights 6 being fixed thereto. A footboard 16 is provided on the lower portion of base 12 to admit a patient thereon, so that the latter will be placed between X-ray source support means 1 and screen 10. A suitable distance beyond this screen, double eyepiece 17 is provided with shutter 18 to afford an alternating vision of the screen to an observer, as will be set forth hereinafter in detail.

An embodiment of the X-ray source support means of the invention is shown in FIGS. 3 to 6 and 10, this X-ray source support means having been devised more particularly for the purpose of holding two X-ray sources for use in three-dimensional radioscopy and radiography. The X-ray source support means is substantially formed of a cylindrical casing 19 the cross section of which may have any curvilinear periphery whatever, and which is closed at its ends by two walls 20, 21. In casing 19 two X-ray tubes 22 having the same characteristics are mounted, and at half the length of one of the less curved portions of the cylindrical surface of the casing, two equal openings 23 are provided, through which the rays from the tubes are projected. From each of the two more curved portions of said cylindrical surface, near walls 20, 21, two hollow cylindrical arms 24 project, viz. four arms in the aggregate. In each of these arms a hollow insulating cylinder having a bottom is fixed by any means adapted to insure sealing, this cylinder being sufficiently long to receive a high-voltage cable terminal of the type as generally used in radiology apparatus.

Two openings are provided in each of walls 20, 21 for two caps which will be described hereinafter, the size of these openings being such that an X-ray tube may easily be inserted in the support means through each of them. An annular shoulder 25, threaded inside, around the circumference of each opening projects from the wall, a short distance from the opening. To stand heat and oil action, packing 27 is inserted in the inner seat 26 thus formed between the periphery of the opening and shoulder 25.

With reference to FIG. 5 showing a portion of wall 20, a cap 28 is placed on packing 27, this cap consisting of a dome with an outer flange 29 engaging packing 27. In a suitable place, the bottom of this dome has a threaded hole engaging a screw 30, packing 31 being provided between the head of screw 30 and a seat surrounding said hole. To the edge which carries flange 29, a stiff and oil-proof curved baffle plate 32 is fixed, its convexity extending towards the inner face of the dome. A hole 33 is provided in a suitable place of plate 32, and a spout 34 fixed on the periphery thereof projects into the dome. The cap unit 28 is held in place and sealed by ring 35 the outer surface of which is threaded to engage with the inner threading in shoulder 25.

With reference to FIG. 6, cap 36 comprises a cup having a flange 37 on its edge and held in place by ring 38, and is placed on packing 39 the outer surface of this ring being threaded to seal the cap in the same way as ring 35 seals cap unit 28. On the inner face of the bottom of the cup one of the ends of a corrugated tube 40 is welded, the other end being closed by a bottom 41 whose face opposite the bottom of the cup is provided with a projection or ring 42 on the axis of said corrugated tube, this projection or ring being threaded inside, whilst on the bottom of the cups, still on the axis of corrugated tube 40, there is a hole wherein a collar 44 having a smooth axial bore 43 may be inserted, if desired.

To fill with an insulating liquid an X-ray source support means as above described which has been fixed to flange 3 and wherein the two X-ray tubes have been arranged, screws 30 are removed, and then the two caps 28 are entirely filled by pouring the liquid through one of the threaded holes from which screws 30 have been removed. When pouring the liquid, caps 28 should be held in their highest position, whilst the two respective corrugated tubes 40 will be kept slightly compressed by means of a small rod, not shown, having a threaded end which will be introduced into each of the corrugated tubes through holes 43 and screwed into projections 42 threaded inside, a means being thus afforded for compressing the corrugated tubes. On making sure that no gas bubbles remain within the X-ray source support means, the two threaded holes will be closed again with screws 30, and corrugated tubes 40 will be released, by withdrawing said rods through holes 43. Should gas bubbles be formed in the insulating liquid during the operation of support means, they will collect in the higher spaces of the latter, viz. in the domes, through spouts 34, by following an irreversible path, whatever may be the position taken by the stereocup afterwards.

In addition, corrugated tubes 40 may be adapted to give information concerning temperature of the insulating liquid in connection with the pressure during the operation of the apparatus, in a well known manner.

According to a different embodiment of this invention, a cover is provided on upper portion 20 of an X-ray source support means, as shown in FIG. 10. In this embodiment, a circular cover 50, provided with flange 51, is substituted for caps 28, this cover being fixed to edge 53 of a circular hole 54 in the top, and packing 52 being inserted between flange 51 and edge 53. Cover 50 is provided with spout 55 extending towards dome 56, and screw 57 seals the cover in the same way as screw 30 seals cap 28 in FIG. 5 with respect to outer room, screw 57 being screwed in a threaded hole in cover 50, which hole, however, is larger than the hole in cap 28 to provide for easy escape of air when filling with the insulating liquid.

In a still further embodiment of the invention, the X-ray source support means is provided with one opening only, through which the beams of X-rays from the tubes will be projected alternately.

The eyepiece shutter of FIG. 1 is shown in FIGS. 7 and 8 more in detail. In this embodiment, the shutter comprises a cup 45, having the shape of a frustum of cone or any suitable hollow shape, which is closed by a bottom 46 at its smaller end, whilst the other end is open and has a flange 47 which is provided with two diametrically opposite apertures 48. The shutter unit is mounted on rotary shaft 49 in any suitable manner, an example of which is shown in FIG. 8 but will not be described here since it is no part of this invention.

The shape of the shutter is such that an observer may place his eyes as near flange 47 as a few millimeters, since the hollow part 45 affords a space wherein an observer's nose may easily be accommodated. This remarkable nearness of the observer's eyes to the shutter reduces the interval between vision and concealment of the screen to an extremely short time, thus eliminating the sensation of flickering entirely, without having recourse to means involving an increase of shutter peripheral speed.

As already mentioned in the introductory part of this specification, the shutter according to this embodiment of the invention will turn at 1800 r.p.m. where current is supplied at 60 cycles, and consequently, it will uncover the two eyepieces successively with an interval of $\frac{1}{120}$ of a second. However, this is only an example based on the assumption that the operation of the whole apparatus is dependent on the frequency in the mains, but a different frequency may be used for the current supplied to the X-ray tubes by changing the frequency from the mains to a predetermined value, by any suitable means. Of course, the frequency thus varied must be the same for both tubes and also must be in accordance with the shutter opening and shutting rate.

Referring now to FIG. 8, an enlarged portion is shown of a direct vision viewing means where a shutter of the invention is applied, this portion being broken away from the remainder of the viewing means on line 58. To this end, the front wall 59 of the viewing means carrying the eyepieces is of the same shape as cup 45, whereby the lattter will fit the back of it but out of contact with it.

In a different embodiment of the eyepiece shutter, the latter is provided with more than two apertures. For instance, the shutter may comprise four apertures, and in this case its speed will be half the speed required for a two-aperture shutter, the uncovering of each eyepiece taking place at every 45° of rotation.

Moreover, a simple flat ring not having a cup may be substituted for flange 47 with cup 45 as described above.

A clutch of the invention for use in a viewing means is shown in FIG. 9 by way of example. In the embodiment shown, the driving shaft 60 is loosely surrounded by a sleeve 61 which is the driving member of the clutch. Where it is desirable to increase the inertia of sleeve 61, this is provided with a flywheel 62, which may be fixed thereon by any suitable means, or may be formed thereon. The end of sleeve 61 which surrounds driving shaft 60 is formed with a pair of helical teeth 63. A helical slot 64 is provided through the whole thickness of sleeve 61, and pin 65 projecting from driving shaft 60 is sufficiently free to slide in helical slot 64. The spiral of the latter has reverse direction to the generating spiral for teeth 63 on sleeve 61 but a longer pitch. Driven member 66 of the clutch is fixed to the end of driven shaft 67 facing driving shaft 60, and the end of this member is formed with teeth 68 adapted to engage with teeth 63 in driving clutch member 61.

Now, assuming that driving shaft 60, originally at rest, is driven in rotation in the direction shown by arrow A in FIG. 9, this taking place very slowly, then the friction between the narrow contacting areas of the surface of shaft 60 and the inner cylindrical surface of sleeve 61 will drive this sleeve in rotation at the speed of shaft 60. Should, however, a speed be suddenly imparted to the shaft 60, the inertia of the sleeve will prevail over the friction thereof with the shaft, and consequently, the sleeve will also be driven in rotation but with a lower speed than the speed of the shaft 60, generally a much lower speed. In this instance, the helical slot 64 in sleeve 61 is obliged to slide by pin 65 projecting radially from shaft 60, and consequently, sleeve 61, while swinging on the shaft by a small portion of one revolution, will slide on the shaft axially, as shown by arrow B, until its teeth 63 engage with teeth 68 on member 66 of the clutch, and thus the two shafts will be rigidly connected together. This connection will be kept as long as the driving shaft speed does not change, or even if this speed increases with respect to speed of sleeve 61. If, on the other hand, a sudden, and substantial decrease occurs in the speed of shaft 60, the action of inertia of sleeve 61 will be the reverse to that just discussed, and will cause teeth 63 to be disengaged from teeth 68 thus stopping the transmission of rotation. Owing to the different pitch of teeth 63 and slot 64, teeth 63 will be disengaged from teeth 68 without sliding.

The control means for an eyepiece shutter comprising a clutch as above described is as follows. A commutator asynchronous motor 69 is fixed to a lower portion of the wall which carries eyepieces 17 and has its shaft 70 inserted in sleeve 61 of the clutch. An iron four-arm cross-like member 71 is carried by shaft 72 fixed to part 66 of the clutch, and the four arms of member 71 being of the same size and equally spaced apart in a plane at right angles with the shaft axis; each of them ends with a bent portion 73 also at right angles therewith. The portion of shaft 72 where member 71 is fixed faces one end of core 74 of an electromagnet 75, this core being positioned at right angles with the shaft. The latter ends with a bevel gear wheel 76 beyond member 71, this wheel being in mesh with bevel gear wheel 77 keyed on shaft 49 to which the shutter of FIG. 7 is fixed. Preferably, motor 69 is a single-phase one.

To operate the shutter, current is sent to motor 69 and to magnet 75. Motor 69 will start and bring cross-like member 71 to synchronous speed in a few seconds, through clutch 61—66, then motor 69 will be switched off, shaft 70 being thus disengaged from shaft 72 automatically. It will be seen that cross-like member 71 will form an armature for magnet 75, and the latter will impart a thrust thereto at every magnetic reversal in core 74, the unit comprising magnet 75 and cross-like armature 71 operating as a perfectly synchronous motor which will drive the shutter at exactly synchronous speed and afford an absolutely uniform speed of rotation which could not be secured if asynchronous motor 69 were to drive the shutter direct.

Where a greater inertia is required, sleeve 61 may be provided or formed with a flywheel of suitable size.

It will be noted that teeth 63 and 68 may be in a different number from the two as above set forth, and also other suitable coupling means may be substituted for them between the member adapted to turn on the driving shaft and the member fixed to the driven shaft. Moreover, two or more pins may be substituted for pin 65, and of course the number of slots in sleeve 61 will be increased accordingly, instead of a single slot 64 being provided. Again, one or more helical grooves in the inner cylindrical surface of sleeve 61 which will not extend through the whole thickness thereof may be substituted for slot or slots 64.

In a modified arrangement as illustrated in the diagram of FIG. 11, one motor 78 is substituted for asynchronous motor 69, magnet 75, and armature 71. Motor 78 has a three-phase stator 79 and a single-phase rotor 80, the terminals of the latter comprising rings 81 provided with sliding contacts 82. In starting the motor, three-phase current is supplied to the stator 79 e.g. by converting single-phase current from the mains to three-phase current by any suitable means, and the rotor will be short-circuited by connecting rings 81 together through switch 83 on. Once the motor is started, rings 81 will be disconnected, and a direct current will be supplied to them through sliding contacts 82 and rings 81, the motor thus operating at perfectly synchronous speed. This arrangement affords the advantage of allowing to invert synchronism of eyepiece and X-ray tube operations by reversing the rotor current through change-over switch 84 in that, should e.g. synchronism take place between the uncovering of right-hand eyepiece and projection from one X-ray tube in a given position of change-over switch 84, the projection from this tube will take place synchronously with the uncovering of left-hand eyepiece in the other position of change-over switch 84.

While a number of embodiments of this invention have been described hereinbefore and shown in the drawings by way of example, it will be understood that the present invention is in no way limited to such embodiments. It will also be apparent that the features of the embodiments herein shown and/or described are mutually interchangeable and that still other modifications may be made within the scope of the invention as defined by the appended claims.

I claim:

1. In a three-dimensional radiology apparatus having two X-ray sources for projecting images of a subject on a surface by means of rays from said sources, a viewing means comprising a pair of eyepieces adapted to view said images, an eyepiece shutter including a flat ring having at least two apertures, said eyepiece shutter being operatively disposed adjacent said pair of eyepieces, means for rotating said eyepiece shutter about the geometrical axis of said flat ring, and means for accommodating an observer's nose within said flat ring such that the observer's eyes can be kept as near said flat ring as possible, said apertures uncovering one eyepiece at a time during the rotary motion of said flat ring, the proximity of the observer's eyes to said eyepiece shutter avoiding the sensation of flickering.

2. In a three-dimensional radiology apparatus having two X-ray sources for projecting images of a subject on a surface by means of rays from said sources, viewing means comprising a pair of eyepieces, an eyepiece shutter including a cup of substantially frusto-conical shape, a flange having at least two apertures and being carried by the base of the cup, a shaft coupled to said cup for imparting a rotary motion to said shutter about its geometrical axis, said cup permitting an observer's eyes to be positioned as near said flange as possible by accommodating the observer's nose, the proximity of the observer's eyes to the shutter avoiding the sensation of flickering.

3. In a three-dimensional radiology apparatus having two X-ray sources for projecting images of a subject on a surface by means of rays from said sources, an eyepiece shutter, means for driving said eyepiece shutter comprising a driving motor including a rotor shaft coupled to and driving the eyepiece shutter, a starting motor including a rotor shaft, a clutch for coupling the rotor shaft of said driving motor to the rotor shaft of said starting motor, a slidable member on the end of the rotor shaft of said starting motor facing the rotor shaft of said driving motor, the slidable member being adapted to slide frictionally on said rotor shaft of said starting motor, the inertia of the slidable member for substantial variations of its rotational speed overcoming friction to cause a relative angular movement between said slidable member and said rotor shaft of said starting motor, means for translating said relative angular movement to a longitudinal movement of said slidable member, and a complementary part fixed to the end of the rotor shaft of said driving motor to receive said slidable member.

4. Three-dimensional radiology apparatus according to claim 3, wherein said slidable member is a sleeve.

5. Three-dimensional radiology apparatus according to claim 3 comprising a flywheel operatively associated with said member to increase the inertia.

6. Three-dimensional radiology apparatus according to claim 3, comprising at least one pin projecting from the rotor shaft of said starting motor, a sleeve adapted to slide out of the latter said rotor shaft and defining a helical slot for the pin whereby said sleeve may slide longitudinally of said latter rotor shaft upon a variation of the relative speeds of rotation of said sleeve and the rotor shaft of said starting motor, said sleeve having an end constituted by helical teeth, the generating spiral for which has a direction opposite to that of the helical spiral of said slot and a smaller pitch, the rotor shaft of said driving motor having an end constituted by teeth for engaging the teeth of said sleeve.

7. Three-dimensional radiology apparatus according to claim 3, comprising at least one pin on the rotor shaft of said starting motor, a slidable sleeve on the latter said rotor shaft, said sleeve defining inner helical grooves adapted to slide on the latter said rotor shaft whereby said sleeve may slide longitudinally when a variation in relative speed of rotation occurs between said sleeve and said rotor shaft, said sleeve having an end facing the rotor shaft of said driving motor and including helical teeth the generating spiral for which has a direction opposite to that of the helical spiral of said groove and a smaller pitch.

8. In a three-dimensional radiology apparatus having two X-ray sources for projecting images of a subject on a surface by means of said rays, a stereoptical viewing eyepiece shutter, means for driving said eyepiece shutter at exactly synchronous speed by a synchronous motor, and by an asynchronous motor for starting said synchronous motor.

9. In a three-dimensional radiology apparatus having two X-ray sources for projecting images of a subject on a surface by means of said rays, a stereoptical viewing eyepiece shutter, a synchronous motor for driving said eyepiece shutter at exactly synchronous speed, said synchronous motor having a three-phase stator and a single-phase rotor, means for feeding direct current to said rotor after the same has been started for allowing magnetic reversals in said rotor, and means for changing the direction of the direct current to invert the synchronism of said X-ray sources and eyepiece shutter operation.

References Cited in the file of this patent

UNITED STATES PATENTS

| | | |
|---|---|---|
| 660,006 | Doyen | Oct. 16, 1900 |
| 1,390,250 | Rodriguez | Sept. 6, 1921 |
| 1,555,508 | McDonald | Sept. 29, 1925 |
| 1,995,054 | Chambers | Mar. 19, 1935 |
| 2,208,215 | Rincones | July 16, 1940 |
| 2,273,538 | Rogers | Feb. 17, 1942 |
| 2,295,243 | Steinman | Sept. 8, 1942 |
| 2,441,850 | Smith et al. | May 18, 1948 |
| 2,592,496 | Vigh | Apr. 8, 1952 |
| 2,808,517 | Cordingly | Oct. 1, 1957 |
| 2,860,253 | Rosenberg | Nov. 11, 1958 |